(12) United States Patent
Yamashita et al.

(10) Patent No.: US 10,666,846 B2
(45) Date of Patent: May 26, 2020

(54) IMAGING DEVICE

(71) Applicant: Panasonic Intellectual Property Management Co., Ltd., Osaka (JP)

(72) Inventors: Masatoshi Yamashita, Osaka (JP); Norihisa Yoshimura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 37 days.

(21) Appl. No.: 16/311,044

(22) PCT Filed: Sep. 15, 2017

(86) PCT No.: PCT/JP2017/033386
§ 371 (c)(1),
(2) Date: Dec. 18, 2018

(87) PCT Pub. No.: WO2018/061816
PCT Pub. Date: Apr. 5, 2018

(65) Prior Publication Data
US 2019/0335073 A1    Oct. 31, 2019

(30) Foreign Application Priority Data
Sep. 28, 2016    (JP) .................................. 2016-189085

(51) Int. Cl.
*H04N 5/225*    (2006.01)
*G01B 11/14*    (2006.01)
(Continued)

(52) U.S. Cl.
CPC ........... *H04N 5/2256* (2013.01); *G01B 11/14* (2013.01); *G03B 15/05* (2013.01); *G03B 15/06* (2013.01);
(Continued)

(58) Field of Classification Search
None
See application file for complete search history.

(56) References Cited

U.S. PATENT DOCUMENTS

| 2013/0294089 A1* | 11/2013 | Freedman | G01B 11/25 362/311.01 |
| 2014/0286475 A1* | 9/2014 | Nakamura | G01T 1/16 378/51 |

FOREIGN PATENT DOCUMENTS

JP    2014-203032    10/2014

OTHER PUBLICATIONS

International Search Report of PCT application No. PCT/JP2017/033386 dated Dec. 19, 2017.

\* cited by examiner

*Primary Examiner* — Quan Pham
(74) *Attorney, Agent, or Firm* — McDermott Will & Emery LLP

(57) ABSTRACT

An imaging device includes a light source, a plurality of lenses disposed adjacent to one another on a predetermined plane, a diffuser plate that diffuses light to be emitted from the light source, and an imaging element that includes a plurality of pixels, the imaging element being configured to receive reflection light generated by causing the light diffused by the diffuser plate to be reflected from a subject. The plurality of lenses are disposed so that a period of interference fringes in the diffused light is less than or equal to three pixels of the imaging element. This configuration can provide the imaging device in which an influence of the interference fringes of the diffused light can be suppressed in an image that is obtained when an image of the subject is captured by irradiating the subject with the light diffused by the diffuser plate having the plurality of lenses.

4 Claims, 17 Drawing Sheets

(51) Int. Cl.
*G03B 15/05* (2006.01)
*G03B 15/06* (2006.01)
*H04N 5/232* (2006.01)
*G06T 5/00* (2006.01)
*G06T 5/20* (2006.01)

(52) U.S. Cl.
CPC ....... *H04N 5/2254* (2013.01); *H04N 5/23229* (2013.01); *G03B 2215/0592* (2013.01); *G06T 5/002* (2013.01); *G06T 5/20* (2013.01)

IMAGING DEVICE

CROSS-REFERENCE TO RELATED APPLICATIONS

This application is a U.S. national stage application of the PCT International Application No. PCT/JP2017/033386 filed on Sep. 15, 2017, which claims the benefit of foreign priority of Japanese patent application No. 2016-189085 filed on Sep. 28, 2016, the contents all of which are incorporated herein by reference.

TECHNICAL FIELD

The present invention relates to an imaging device including a diffuser plate that diffuses and emits laser light to a subject within an angle of view.

BACKGROUND ART

Conventionally, an imaging device includes a diffuser plate configured by a lens array having a plurality of lenses that are arranged to be adjacent to one another. The diffuser plate uniformly diffuses light emitted from a light source.

In a case of the diffuser plate in which the respective lenses are regularly arranged in a grid pattern, use of a light source such as a laser diode for emitting coherent light to an imaging device causes interference of light passing through the lenses due to diffraction. This causes interference fringes. The interference fringes deteriorate uniformity of light intensity in the diffused light emitted to a subject.

Therefore, in order to suppress generation of the interference fringes in the diffused light, there is proposed, for example, a diffuser plate in which two or more kinds of lenses having different curved surfaces are disposed (for example, see PTL 1). As a result, uniform diffused light intensity is obtained.

However, the diffuser plate has a plurality of lenses. For this reason, when coherent light is emitted from the light source, interference fringes in the diffused light cannot be completely eliminated. As a result, an image that is obtained in a manner that an imaging element of the imaging device receives the diffused light reflected by the subject is occasionally affected by the interference fringes.

CITATION LIST

Patent Literature

PTL 1: Unexamined Japanese Patent Publication No. 2014-203032

SUMMARY OF THE INVENTION

The present invention provides an imaging device that can suppress an influence of interference fringes generated in diffused light in an image obtained when an image of a subject is captured by irradiating the subject with light diffused by a diffuser plate having a plurality of lenses.

The imaging device of the present invention includes a light source, a diffuser plate that includes a plurality of lenses disposed adjacent to one another on a predetermined plane and that diffuses light emitted from the light source, and an imaging element that includes a plurality of pixels, the imaging element being configured to receive reflection light generated by causing the light diffused by the diffuser plate to be reflected from a subject. The plurality of lenses are disposed so that a period of interference fringes in the light having been diffused is less than or equal to three pixels of the imaging element.

According to this configuration, the period (interval) of the interference fringes in the diffused light received by the imaging element (diffused light reflected from the subject) is less than or equal to three pixels of the imaging element. As a result, the influence of the interference fringes in the image obtained by the imaging element is suppressed. That is, the period of the interference fringes generated in the diffused light is adjusted according to the arrangement of the plurality of lenses in the diffuser plate. As a result, even if interference fringes are generated in the diffused light due to passing through the diffuser plate, the influence of the interference fringes in the image obtained by the imaging element can be suppressed.

Further, an imaging device of the present invention includes a light source, and a diffuser plate that includes a plurality of lenses disposed adjacent to one another on a predetermined plane and that diffuses light emitted from the light source. Further, the imaging device includes an imaging element that has a light receiving surface for receiving reflection light generated by causing the light diffused by the diffuser plate to be reflected from a subject and outputs a signal corresponding to the reflected light received by the light receiving surface, and a processor that executes a filter process on the signal output from the imaging element in a unit of a pixel group constituted by a plurality of adjacent pixels in the imaging element. The plurality of lenses are disposed so that a period of interference fringes in the light having been diffused is less than or equal to a size of the pixel group of the imaging element.

According to this configuration, the period of the interference fringes in the diffused light received by the imaging element (the diffused light reflected from the subject) is less than or equal to the size of the pixel group of the imaging element. For this reason, the filter process can be executed more reliably on non-uniformity of received light intensity in the imaging element due to the interference fringes (non-uniformity of diffused light intensity in the diffused light). As a result, the influence of the interference fringes in the image obtained by the imaging element can be effectively suppressed.

That is, when the period of the interference fringes is larger than the unit of the pixel group on which the processor of the imaging element executes the filter process, if interference fringes are generated in the diffused light, non-uniformity (a difference) is generated in the received light intensity (diffused light intensity) among a plurality of pixel groups. For this reason, even if the non-uniformity of the received light intensity in the pixel group is eliminated by the filter process, the non-uniformity of the received light intensity among the pixel groups cannot be eliminated. Therefore, although the influence of the interference fringes in the image obtained by the imaging element is great, the period of the interference fringes generated in the diffused light due to the arrangement of the plurality of lenses is set to be less than or equal to the size of the pixel group of the imaging element like the above-described configuration. As a result, the non-uniformity of the received light intensity is caused in the pixel group of the imaging element by the interference fringes, and the non-uniformity of the received light intensity caused by the interference fringes is eliminated or suppressed by the filter process. As a result, the influence of the interference fringes in the image obtained by the imaging element can be effectively suppressed.

Further, in the imaging device of the present invention, the plurality of lenses are disposed in a state where positions of vertexes of the lenses are randomly shifted on the predetermined plane respectively from a plurality of virtual grid points arranged in a first direction and a second direction perpendicular to the first direction with intervals on a predetermined plane. A shift amount between each of the positions of the vertexes of the lenses and a corresponding one of the plurality of virtual grid points in the first direction or the second direction may be less than or equal to 20% of an interval between virtual grid points adjacent to each other in the first and second directions from among the plurality of virtual grid points.

According to this configuration, the plurality of lenses in the diffuser plate are disposed so that the positions of the vertexes are randomly shifted respectively from a plurality of virtual grid points. Therefore, in comparison with a case where the vertexes of the lenses are disposed on the virtual grid points respectively, the interference fringes caused by the passing through the plurality of lenses are hardly generated in the diffused light. As a result, the influence of the interference fringes in the image obtained by the imaging element can be effectively suppressed. Further, the shift amount of the positions of the vertexes of the lenses is suppressed to less than or equal to 20% of the interval of virtual grid points in the first direction or the second direction. As a result, the light orientation having a rectangular shape corresponding to an angle of view is easily obtained.

The above configuration provides the imaging device that can suppress the influence of the interference fringes caused by the diffused light in the image obtained when an image of a subject is captured by irradiating the subject with the light diffused by the diffuser plate having the plurality of lenses.

DESCRIPTION OF EMBODIMENT

Hereinafter, an imaging device according to an exemplary embodiment of the present invention will be described with reference to the drawings.

EXEMPLARY EMBODIMENT

Hereinafter, imaging device 1 including diffuser plate 3 according to a present exemplary embodiment will be described with reference to FIG. 1 and FIG. 2.

Figure 1:
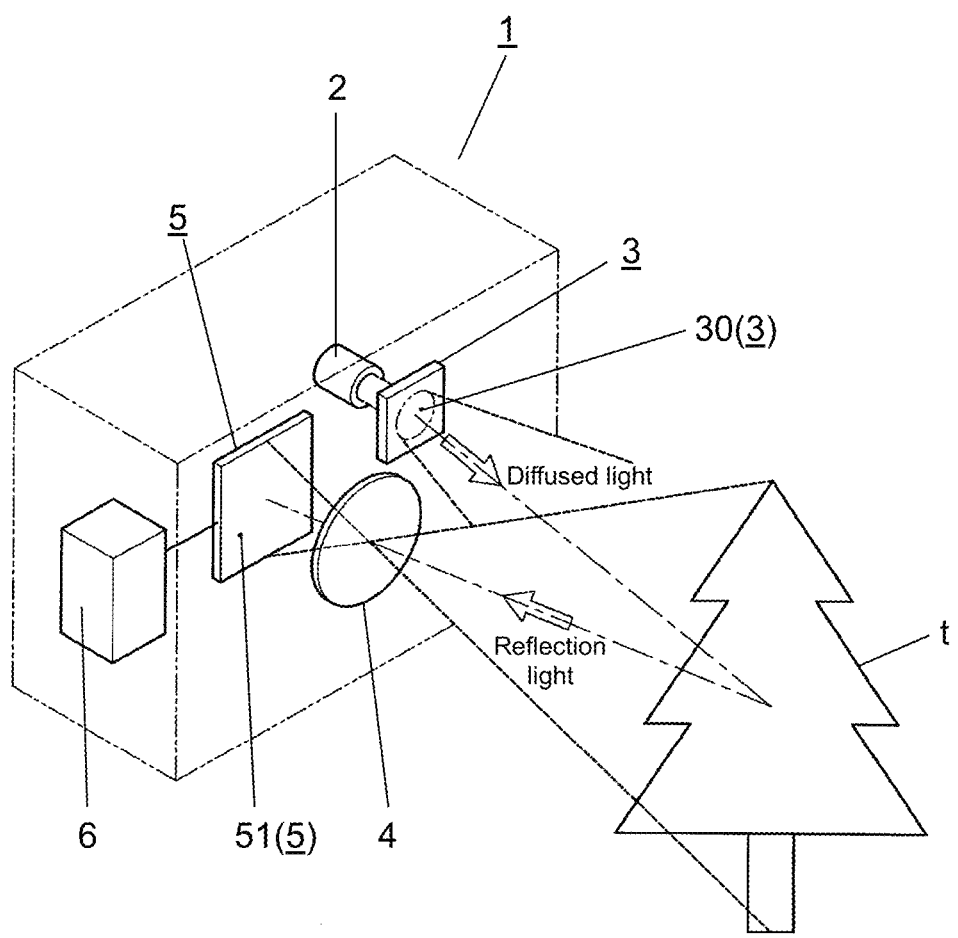
FIG. 1 is a diagram describing a configuration of an imaging device according to an exemplary embodiment of the present invention.
Figure 2:
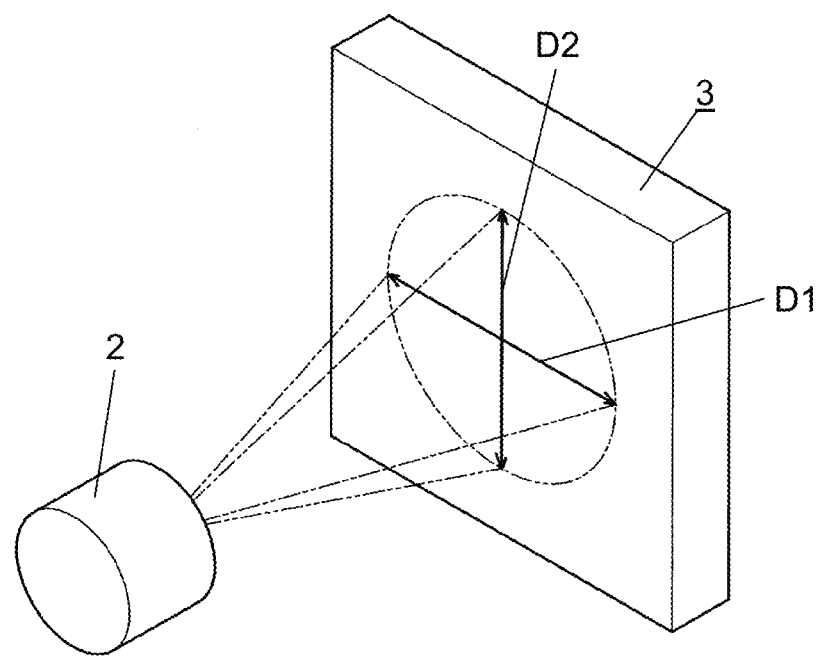
FIG. 2 is a schematic diagram describing a light source and a diffuser plate of the imaging device.

FIG. 1 is a diagram describing a configuration of imaging device 1 according to the exemplary embodiment of the present invention. FIG. 2 is a schematic diagram describing light source 2 and diffuser plate 3 of the imaging device.

Note that imaging device 1 according to the present exemplary embodiment is used in, for example, Time of Flight (TOF) type distance image camera or the like. The TOF type distance image camera first diffuses and emits laser light to a subject from the light source. A two-dimensional image sensor receives a reflection light from the subject and counts time. The camera calculates a distance from a light flying time to the subject, and generates a three-dimensional distance distribution image.

Specifically, imaging device 1 according to the present exemplary embodiment includes, as illustrated in FIG. 1, light source 2, diffuser plate 3, imaging element 5, image forming lens 4, and processor 6. Diffuser plate 3 diffuses light to be emitted from light source 2. Imaging element 5 receives reflection light generated by causing the light diffused by diffuser plate 3 to be reflected from subject t (hereinafter, simply referred to as "reflection light"). Image forming lens 4 is disposed on an optical path of the reflection light advancing from subject t to imaging element 5, and forms an image of the reflection light on imaging element 5. Processor 6 executes a filter process on a signal output from imaging element 5 by a unit of a pixel group (a kernel) constituted by a plurality of adjacent pixels in imaging element 5. As a result, a noise of an image received by imaging element 5 is reduced.

Light source 2 is configured by, for example, a semiconductor laser diode and emits coherent laser light. Specifically, light source 2 emits laser light in which a cross-sectional shape of the laser beam (a shape of emission to a surface perpendicular to an emission direction of the laser light) is ellipsoidal. At this time, light source 2 is, as illustrated in FIG. 2, disposed so that long diameter direction D1 of an ellipse is a horizontal direction and short diameter direction D2 of the ellipse is a vertical direction. Note that the cross-sectional shape of the laser beam to be emitted from light source 2 is not limited to an ellipsoidal shape and may be a circular shape or a square shape.

Imaging device 1 according to the present exemplary embodiment has the above described configuration.

A configuration of diffuser plate 3 according to the present exemplary embodiment will be described with reference to FIG. 3.

Figure 3:
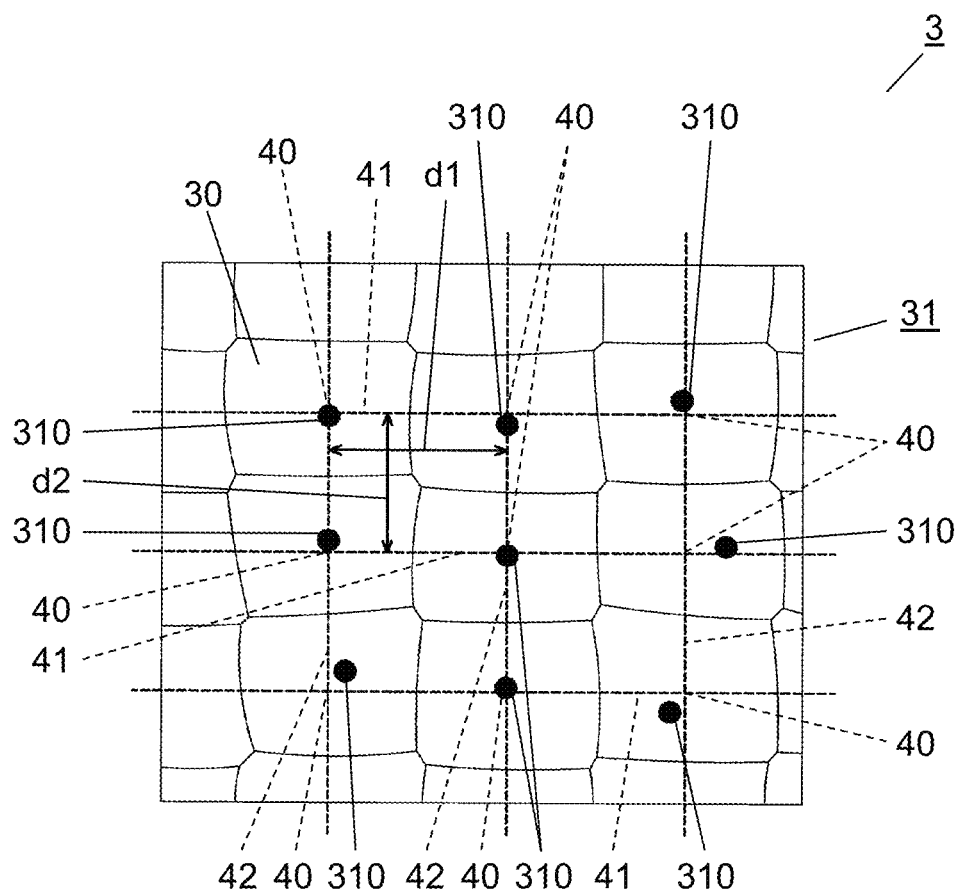
FIG. 3 is an enlarged diagram illustrating a part of the diffuser plate of the imaging device.

FIG. 3 is an enlarged diagram illustrating a part of diffuser plate 3 of the imaging device.

Diffuser plate 3 includes, as illustrated in FIG. 3, a plurality of lenses 30 disposed on a predetermined plane. Specifically, diffuser plate 3 includes lens array 31 including the plurality of lenses 30 disposed adjacent to one another on the plane. Each of lenses 30 has equal curvature radius. Vertexes 310 of lenses 30 are disposed on a common plane. Note that the predetermined plane means any one of a front surface and a rear surface of the diffuser plate. Further, the common plane means the same plane. The same applies in the following description.

At this time, the plurality of lenses 30 are disposed on lens array 31 so that a period of interference fringes in diffused light and reflection light is less than or equal to a size of a pixel group constituting imaging element 5 (a unit of a filter process (kernel)). On lens array 31 according to the present exemplary embodiment, the plurality of lenses 30 are disposed so that the period of the interference fringes in the diffused light (also referred to as diffused reflection light) is less than or equal to three pixels of imaging element 5.

The plurality of lenses 30 are disposed based on a basic arrangement indicated by a broken line in FIG. 3 (a plurality of virtual grid points 40). Note that the plurality of virtual grid points 40 are disposed in a first direction (a horizontal direction in FIG. 3) and a second direction (a vertical direction in FIG. 3) on a predetermined plane with predetermined intervals. The second direction is perpendicular to the first direction. That is, the plurality of lenses 30 are disposed so that positions of vertexes 310 of lenses 30 (hereinafter, occasionally described as "vertex position") randomly shift from grid points 40 corresponding to lenses 30 in the plurality of virtual grid points 40 along the predetermined plane.

Note that virtual lines that connect grid points 40 adjacent to one another in the first direction are referred to as, hereinafter, first grid lines 41. Similarly, virtual lines that connect grid points 40 adjacent to one another in the second direction are referred to as second grid lines 42. That is, intersections between first grid lines 41 and second grid lines 42 disposed in a grid reticular pattern correspond to grid points 40.

Further, the shift amount between the positions of vertexes 310 of lenses 30 and grid points 40 corresponding to vertexes 310 is defined by a shift amount in the first direction and a shift amount in the second direction. At this time, the shift amount in the first direction (the interval) corresponds to the shift amount in the first direction between the positions of vertexes 310 of lenses 30 and grid points 40 corresponding to vertexes 310. Similarly, the shift amount in the second direction corresponds to the shift amount in the second direction between the positions of vertexes 310 of lenses 30 and grid points 40 corresponding to vertexes 310. In the present exemplary embodiment, the shift amount in the first direction is set to be less than or equal to 20% of interval $d_1$ between adjacent grid points 40 in the first direction. Similarly, the shift amount in the second direction is set to be less than or equal to 20% of interval $d_2$ between adjacent grid points 40 in the second direction.

Further, intervals $d_1$, $d_2$ between grid points 40 in the basic arrangement are set so that the period of the interference fringes is less than or equal to three adjacent pixels in the plurality of pixels constituting imaging element 5.

Figure 4:
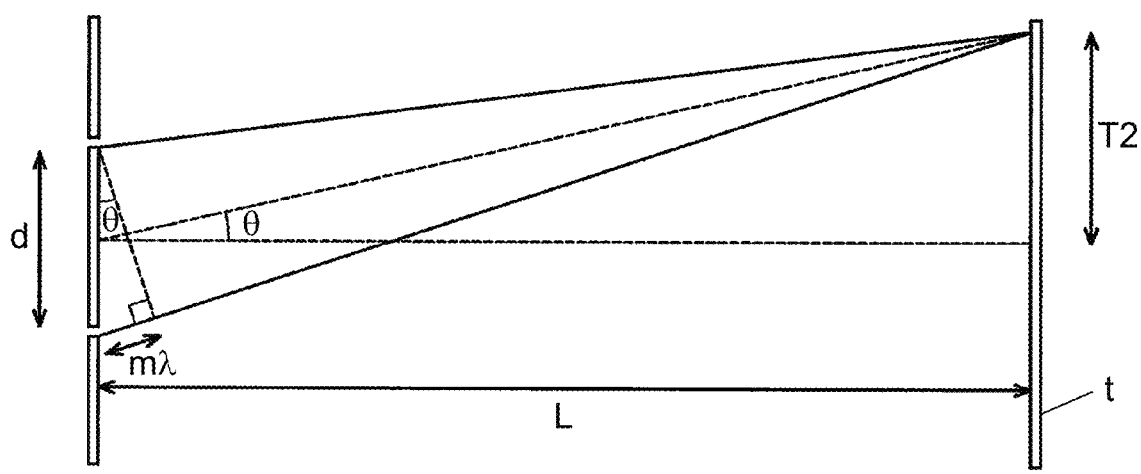
FIG. 4 is a diagram describing an equation for obtaining an interval of grid points in a basic arrangement in the imaging device.

At this time, intervals $d_1$, $d_2$ of grid points 40 that makes the period of the interference fringes be less than or equal to three pixels of imaging element 5 are determined in accordance with following equations (1) to (4) in the arrangement illustrated in FIG. 4.

FIG. 4 is a diagram describing an equation for obtaining the interval between the grid points in the basic arrangement of the imaging device.

$$T1 = L \times pix/EFL \tag{1}$$

$$T2 = L \times \tan\{a\sin(m\lambda/d)\} \tag{2}$$

$$1/T = |1/T1 - 1/T2| \tag{3}$$

$$0 < T \leq 3 \tag{4}$$

Herein, T1 represents a length (mm) corresponding to a size of one pixel of imaging element 5 on subject t in predetermined distance L. T2 represents a period (mm) of interference fringes generated on subject t in the predetermined distance L illustrated in FIG. 4. T represents a period of the interference fringes in imaging element 5 (a pixel unit). Further, pix represents one pixel pitch (mm) of imaging element 5 illustrated in FIG. 4. EFL represents a focal distance of image forming lens 4 for forming an image on imaging element 5. L represents a distance to subject t illustrated in FIG. 4 (in the example of the present exemplary embodiment, L=1000 mm). Symbol "d" represents a distance (mm) between vertexes of lenses 30 in diffuser plate 3 illustrated in FIG. 4 before random shift, namely, an interval (a distance) between adjacent virtual grid points 40 in the basic arrangement. Symbol "λ" represents a wavelength (nm) of laser light to be emitted from light source 2. Symbol ma, represents a difference in an optical path illustrated in FIG. 4, and m is an integer.

Note that equation (1) is for obtaining length T1 corresponding to the size of one pixel of imaging element 5 on subject t in predetermined distance L. Equation (2) is for obtaining period T2 of the interference fringes to be generated on subject t in predetermined distance L (corresponding to so-called Young's double slit). Equation (2) can be expressed separately by following equation (2-1) and equation (2-2).

$$T2 = L \times \tan \theta \tag{2-1}$$

$$\theta = a\sin(m\lambda/d) \tag{2-2}$$

Herein, θ represents an intersection angle illustrated in FIG. 4.

That is, intervals $d_1$, $d_2$ of virtual grid points 40 are set so that above equations (1) to (4) are satisfied. As a result, period T of the interference fringes is less than or equal to three pixels of imaging element 5.

Diffuser plate 3 according to the present exemplary embodiment has the above configuration. At this time, in imaging device 1 in a position illustrated in FIG. 1, diffuser plate 3 is disposed so that the first direction is the horizontal direction and the second direction is the vertical direction.

Image forming lens 4, as illustrated in FIG. 1, forms an image of reflection light reflected from subject t on light receiving surface 51 of imaging element 5.

That is, imaging element 5 includes light receiving surface 51 having a rectangular shape long in the horizontal direction. Light receiving surface 51 corresponds to an angle of view of imaging element 5, and is configured by multiple pixels. Imaging element 5 outputs a signal corresponding to the reflection light received by light receiving surface 51 (in the present exemplary embodiment, corresponding to an image signal) to, for example, processor 6, described later.

Note that imaging element 5 according to the present exemplary embodiment is exemplified by a charge coupled device (CCD), a complementary metal oxide semiconductor (CMOS), or the like.

Processor 6 executes a filter process on an image obtained by light reception by imaging element 5. That is, processor 6 eliminates a noise included in the image signal output from imaging element 5 through the filter process. At this time, processor 6 executes a smoothing process on the image signals output from the plurality of pixels in imaging element 5 by a unit of an image group constituted by the plurality of adjacent pixels. Note that the pixel group includes so-called kernels or masks that are arranged in a matrix pattern of, for example, 3×3, 5×5, or 7×7. In the present exemplary embodiment, processor 6 executes the filter process using, for example, a median filter, a moving-average filter, or a Gaussian filter by a pixel group including 3×3 kernels.

As described above, the reflection light from subject t enters light receiving surface 51 of imaging element 5. The image signal corresponding to the reflection light is output from imaging element 5 to processor 6, and is subjected to the filter process by processor 6.

One example of a method for determining interval d that is a distance between vertexes on diffuser plate 3 of imaging device 1 will be described below with reference to equations (1) to (4). Specifically, a method for setting interval d1 in the first direction with respect to the basic arrangement or interval d2 in the second direction will be described.

Specifications such as a size and a number of pixels of imaging element 5 are determined. As a result, one pixel pitch pix of imaging element 5 is determined. Light source 2 to be used is then determined. As a result, wavelength λ is determined. Specifications of image forming lens 4 are determined. As a result, focal distance EFL of image forming lens 4 is determined.

Predetermined distance L up to subject t is then set arbitrarily. In the present exemplary embodiment, distance L is set to, for example, 1000 mm as described above.

Length T1 corresponding to the size of one pixel of imaging element 5 on subject t in predetermined distance L (1000 mm) is calculated by using equation (1).

Period T2 of the interference fringes generated on subject t in predetermined distance L (1000 mm) is determined so that equations (3) and (4) are satisfied. As a result, intersection angle θ to be set is calculated based on determined period T2 and equation (2-1).

Then, interval d that is the distance between vertexes of lenses 30 in diffuser plate 3 is obtained before random shift so that equation (2-2) is satisfied. Obtained interval d is set as a distance between vertexes 310 of lenses 30 (specifically, an interval between adjacent virtual grid points 40 in the basic arrangement). Note that, in diffuser plate 3 according to the present exemplary embodiment, different intervals d are set in the horizontal direction that is the first direction and the vertical direction that is the second direction. Specifically, interval d1 is set in the horizontal direction and interval d2 is set in the vertical direction. As a result, light orientation that is horizontally long, for example, can be obtained according to the angle of view corresponding to light receiving surface 51 of imaging element 5.

Lenses 30 are disposed, based on interval d determined in the above manner, in the basic arrangement which is the grid pattern as a virtual arrangement. A shift amount of the positions of vertexes 310 of corresponding lenses 30 is set within a range of 0≤shift amount≤(20% of interval d) with respect to grid points 40, and lenses 30 are disposed. As a result, vertexes 310 of lenses 30 are disposed on positions randomly shifted from virtual grid points 40 corresponding to the basic arrangement by the set shift amount.

That is, in diffuser plate 3 according to the present exemplary embodiment, positions of vertexes 310 of lenses 30 are randomly allocated in the first direction in a method that the positions are not shifted from corresponding virtual grid points 40 or in a method that the positions are shifted by the shift amount. Similarly, the positions of vertexes 310 of lenses 30 are randomly allocated in the second direction in a method that the positions are not shifted from corresponding virtual grid points 40 or a method that the positions are shifted by the shift amount.

As described above, interval d that is a distance between the vertexes on diffuser plate 3 of imaging device 1 is determined.

In imaging device 1 according to the present exemplary embodiment, the period of the interference fringes in the reflection light from subject t received by imaging element 5 is set to be less than or equal to a size of a unit of a pixel group that is subjected to the filter process. For this reason, the filter process can be executed more reliably for non-uniformity of received light intensity in imaging element 5 due to interference fringes (non-uniformity of diffused light intensity in the diffused light). As a result, an influence of the interference fringes on an image to be obtained by imaging element 5 can be effectively suppressed. Specific description will be given below.

That is, when the period of the interference fringes is larger than the unit of the pixel group on which imaging element 5 executes the filter process, if the interference fringes are generated in the reflection light, non-uniformity (a difference) is generated in the received light intensity (diffused light intensity) among a plurality of pixel groups. In this case, the non-uniformity of the received light intensity in the pixel group is eliminated by the filter process, but the non-uniformity of the received light intensity among the pixel groups is not eliminated. For this reason, the influence of the interference fringes on an image obtained by imaging element 5 becomes great.

However, in imaging device 1 according to the present exemplary embodiment, vertexes 310 of the plurality of lenses 30 are disposed so that the period of the interference fringes to be caused in the reflection light is less than or equal to the size of the pixel group. In imaging element 5, non-uniformity of received light intensity due to the interference fringes is caused in the pixel groups. In this case, the non-uniformity of received light intensity due to the interference fringes in the pixel groups is eliminated or suppressed by the filter process to be executed by processor 6. As a result, an influence of the interference fringes on the image obtained by imaging element 5 is effectively suppressed.

Specifically, in diffuser plate 3 according to the present exemplary embodiment, the plurality of lenses 30 are disposed so that the period of the interference fringes in the reflection light is less than or equal to three pixels of imaging element 5. As a result, the period (the interval) of the interference fringes in the reflection light received from a subject is less than or equal to three pixels of imaging element 5. As a result, the influence of the interference fringes on the image obtained by imaging element 5 is suppressed. That is, the period of the interference fringes caused in the diffused light is adjusted according to the arrangement of the plurality of lenses 30 of diffuser plate 3. As a result, even if interference fringes are caused in the diffused light due to passing through diffuser plate 3, an influence of the interference fringes on the image obtained by imaging element 5 is suppressed by the filter process.

Further, in imaging device 1 according to the present exemplary embodiment, vertexes 310 of the plurality of lenses 30 are disposed on the predetermined plane so as to be randomly shifted from corresponding grid points 40 in the plurality of virtual grid points 40 arranged with intervals in the first direction and the second direction. The shift amount between the positions of vertexes 310 of lenses 30 and grid points 40 corresponding to the positions of vertexes 310 in the first direction or the second direction are set to be less than or equal to 20% of interval d1 between adjacent virtual grid points 40 in the first direction or the second direction.

That is, vertexes 310 of the plurality of lenses 30 are disposed so as to be randomly shifted from virtual grid points 40. As a result, the interference fringes caused by passing through the plurality of lenses 30 are hardly caused in diffused light, compared to a case where vertexes 310 of lenses 30 are disposed on virtual grid points 40. As a result, an influence of the interference fringes on an image to be obtained by imaging element 5 is further suppressed. Further, the shift amount of the positions of vertexes 310 of lenses 30 is suppressed to be less than or equal to 20% of interval d between grid points 40. As a result, the light orientation having a rectangular shape corresponding to an angle of view is easily obtained. In general, in order to realize the rectangular light orientation, outer shapes of lenses 30 respectively need to have an approximately rectangular shape (including a rectangular shape). At this time, when lenses 30 are disposed so that interval d between grid points 40 exceeds 20%, orientation distribution of the rectangular shape is hard to be obtained. Therefore, as described above, the light orientation is realized corresponding to a rectangular angle of view so that interval d between grid points 40 is less than or equal to 20%.

An effect of imaging device 1 having the above configuration according to the present exemplary embodiment was confirmed in Examples 1 to 6.

Specifically, diffuser plates 3 according to Examples 1 to 6 were manufactured in a method in which parameters in equations (1) to (4) were varied. States of interference fringes and light orientation generated in diffused light were confirmed by using imaging device 1 including manufactured diffuser plate 3. Note that the configurations of imaging device 1 used in Examples 1 to 6 are the same as imaging devices 1 according to the exemplary embodiment except for configurations of diffuser plates 3 manufactured in various parameters (the arrangement of the plurality of lenses 30).

Example 1

The effect of imaging device 1 according to Example 1 obtained by designing diffuser plate 3 described in the exemplary embodiment under the following conditions will be described.

First, period T of the interference fringes on imaging element 5 was within a range of 0<T≤3, and the positions of vertexes 310 of lenses 30 were randomly shifted from corresponding grid points 40. At this time, diffuser plate 3 was manufactured under a condition that the shift amount was 10% of interval d between adjacent grid points 40.

More specifically, one pixel pitch pix of imaging element 5 was 0.0112 mm, focal distance EFL of image forming lens 4 was 2.09 mm, distance L up to subject t was 1000 mm, wavelength λ of laser light was 855 nm, and m was one period. Further, length T1 corresponding to the size of one pixel of imaging element 5 on subject t in distance L was about 5.36 mm, interval d1 between adjacent grid points 40 in the first direction was 0.36 mm, and period T2 of the interference fringes caused on subject t in distance L in the first direction was about 2.4 mm. Further, period T of the interference fringes on imaging element 5 in the first direction was about 0.8 pixel, interval d2 between adjacent grid points 40 in the second direction was 0.23 mm, period T2 of the interference fringes caused on subject t in distance L in the second direction was about 3.7 mm, and period T of the interference fringes on imaging element 5 in the second direction was about 2.3 pixels.

Diffuser plate 3 according to Example 1 designed under the above conditions was manufactured, and was installed in imaging device 1 to be evaluated. An obtained result is illustrated in FIG. 5 to FIG. 7.

Figure 5:
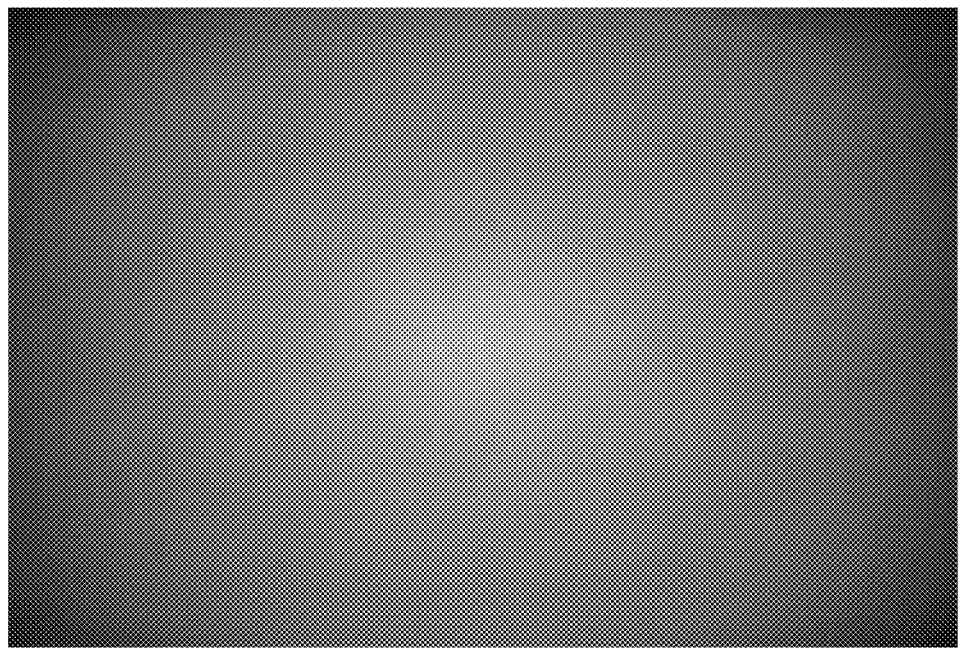
FIG. 5 is a diagram illustrating a captured image in the imaging device according to Example 1.

FIG. 5 is a diagram illustrating a captured image in the imaging device according to Example 1. FIG. 6 is a diagram illustrating a simulation result of the interference fringes on the light receiving surface of the imaging element according to Example 1. FIG. 7 is a diagram illustrating a simulation result of the light orientation according to Example 1. Note that upper left part of the diagram in FIG. 7 illustrates an orientation distribution chart, and an upper right part of the diagram illustrates an illuminance profile in a vertical cross-section of the orientation distribution chart (a Y direction corresponding to the second direction). Similarly, a lower left part of the diagram illustrates an illuminance profile of a cross section of the orientation distribution chart (an X direction corresponding to the first direction). Further, horizontal axes in the X direction and in the Y direction of the illuminance profile represents a distance from a center of the orientation distribution chart, and a corresponding vertical axis represents illuminance of light respectively. Hereinafter, the same applies to FIG. 10, FIG. 12, FIG. 14, FIG. 16, and FIG. 18.

Figure 6:
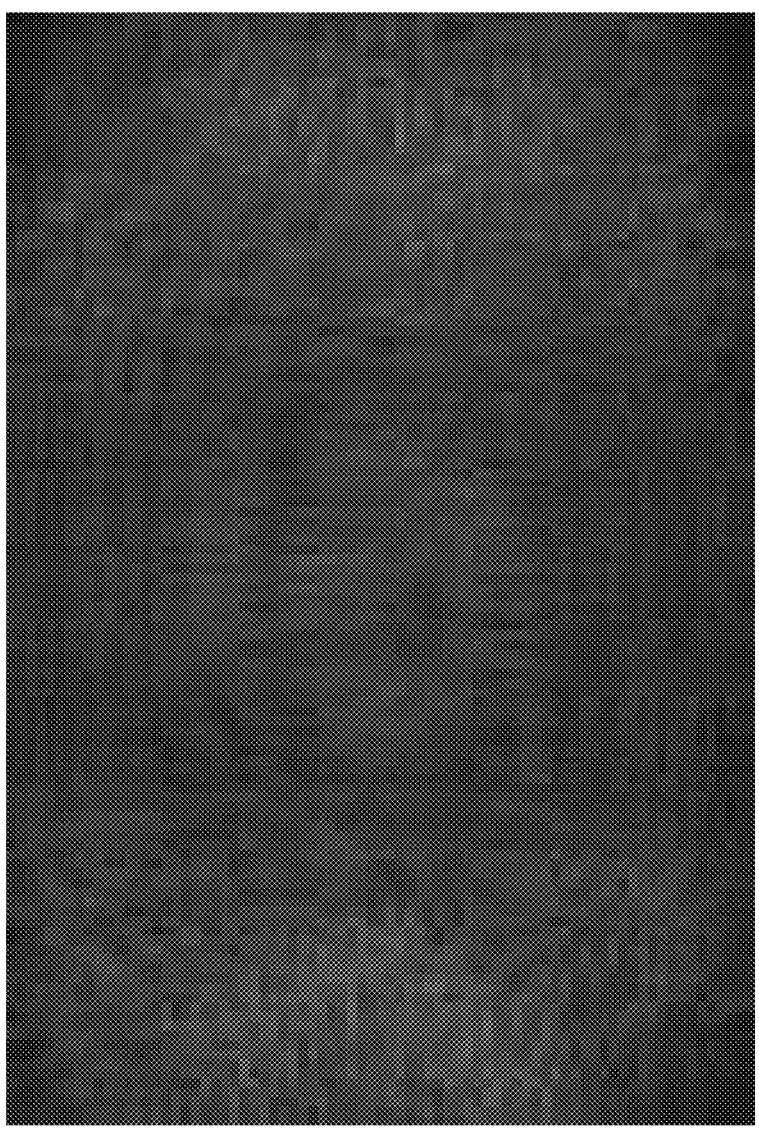
FIG. 6 is a diagram illustrating a simulation result of interference fringes on a light receiving surface of an imaging element according to Example 1.
Figure 7:
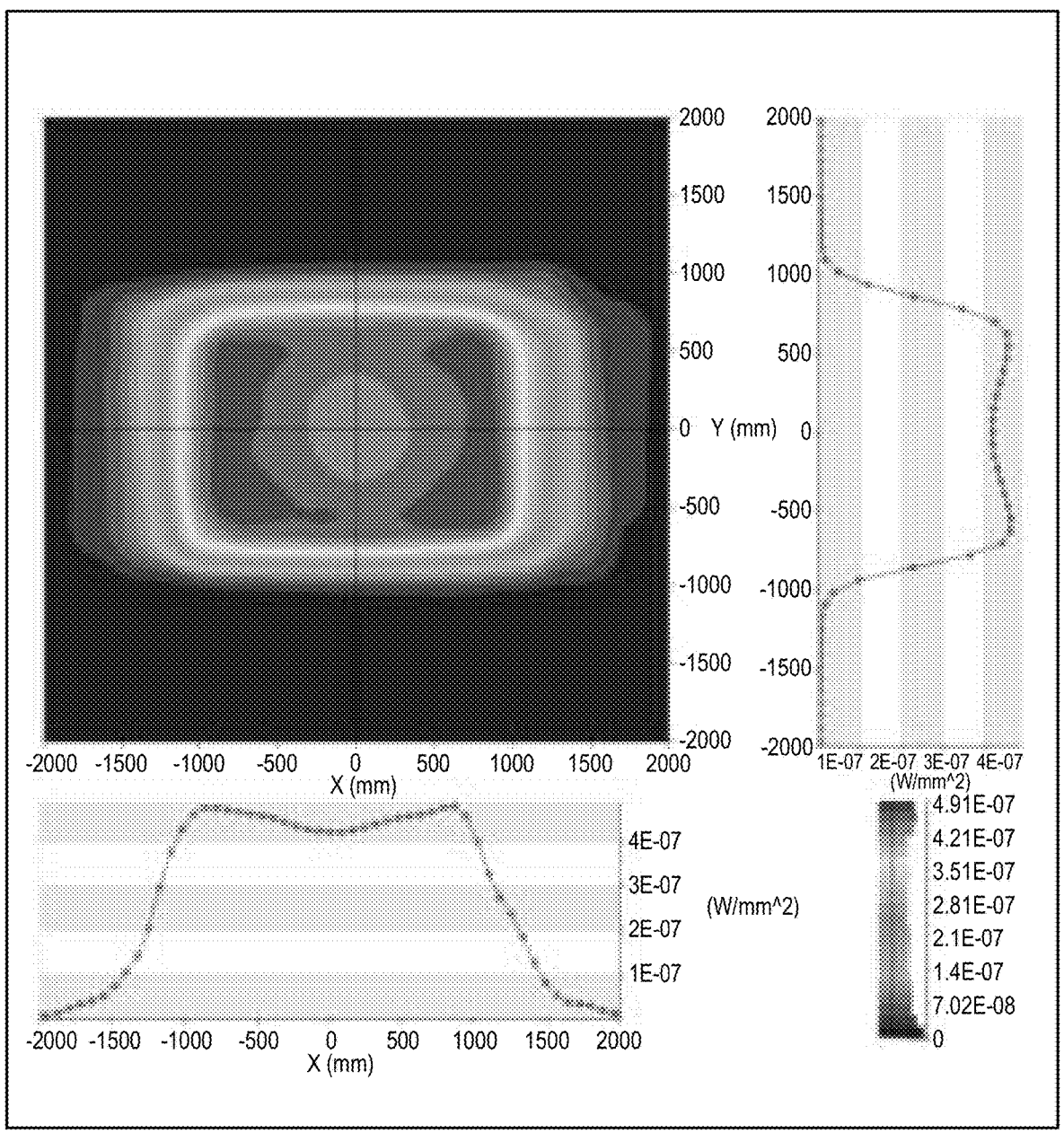
FIG. 7 is a diagram illustrating a simulation result of light orientation according to Example 1.

It was found from the results illustrated in FIG. 5 to FIG. 7 that imaging device 1 including diffuser plate 3 according to Example 1 designed based on the above conditions could obtain an image in which unevenness due to the interference fringes was sufficiently reduced. Further, it was confirmed that a rectangular light orientation was obtained.

Example 2

An effect of imaging device 1 according to Example 2 obtained by designing diffuser plate 3 described in the above exemplary embodiment under the following conditions will be described. Note that, hereinafter, for example, one pixel pitch pix of imaging element 5 described in detail in Example 1 is described simply as pix, and focal distance EFL of image forming lens 4 is described as EFL. The same applies in the following Examples.

First, period T of the interference fringes on imaging element 5 was set to 3<T, and the positions of vertexes 310 of lenses 30 were randomly shifted from corresponding grid points 40. At this time, diffuser plate 3 was manufactured under a condition that the shift amount was 10% of interval d between adjacent grid points 40.

More specifically, pix was 0.0112 mm, EFL was 3.68 mm, L was 1000 mm, λ was 855 nm, and m was one period. Further, T1 was about 3.04 mm, d1 was 0.28 mm, T2 in the first direction was about 3.1 mm, T in the first direction was about 8 pixels, d2 was 0.2 mm, T2 in the second direction was about 4.3 mm, and T in the second direction was about 3.5 pixels.

Diffuser plate 3 according to Example 2 designed under the above conditions was manufactured, and was installed into imaging device 1 to be evaluated. Obtained results are shown in FIG. 8 to FIG. 10.

Figure 8:
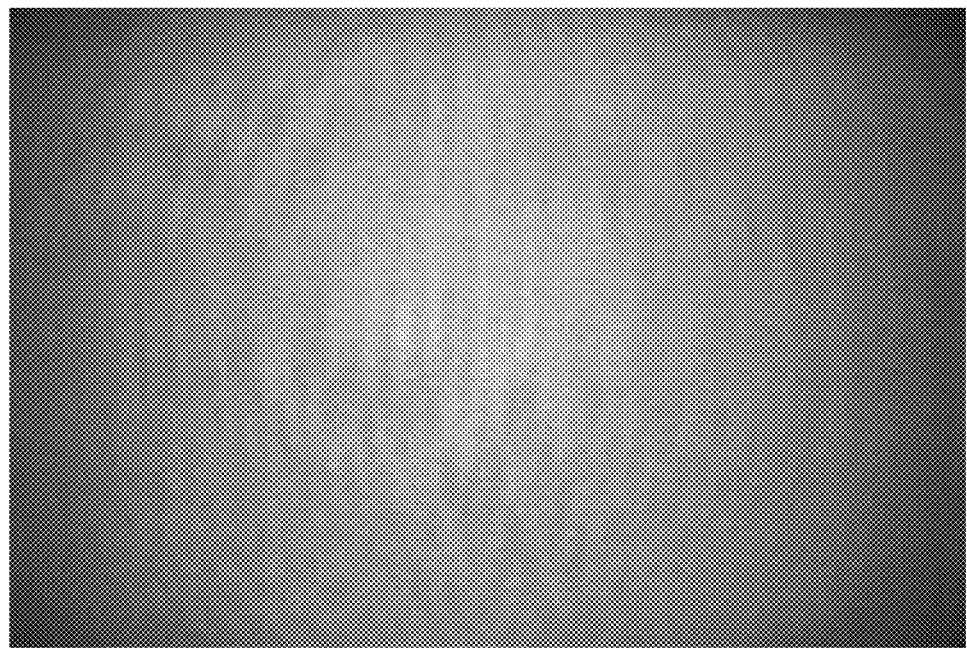
FIG. 8 is a diagram illustrating a captured image in the imaging device according to Example 2.

FIG. 8 is a diagram illustrating a captured image in the imaging device according to Example 2. FIG. 9 is a diagram illustrating a simulation result of the interference fringes on the light receiving surface of the imaging element according to Example 2. FIG. 10 is a diagram illustrating a simulation result of the light orientation according to Example 2.

Figure 9:
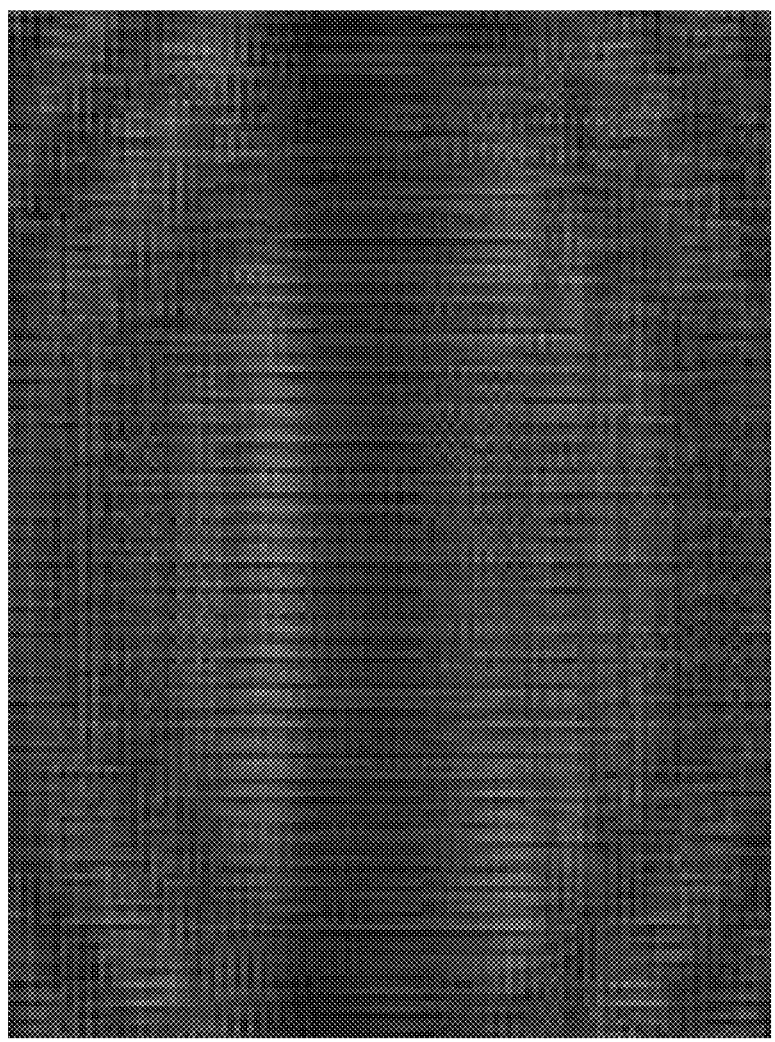
FIG. 9 is a diagram illustrating a simulation result of the interference fringes on the light receiving surface of the imaging element according to Example 2.
Figure 10:
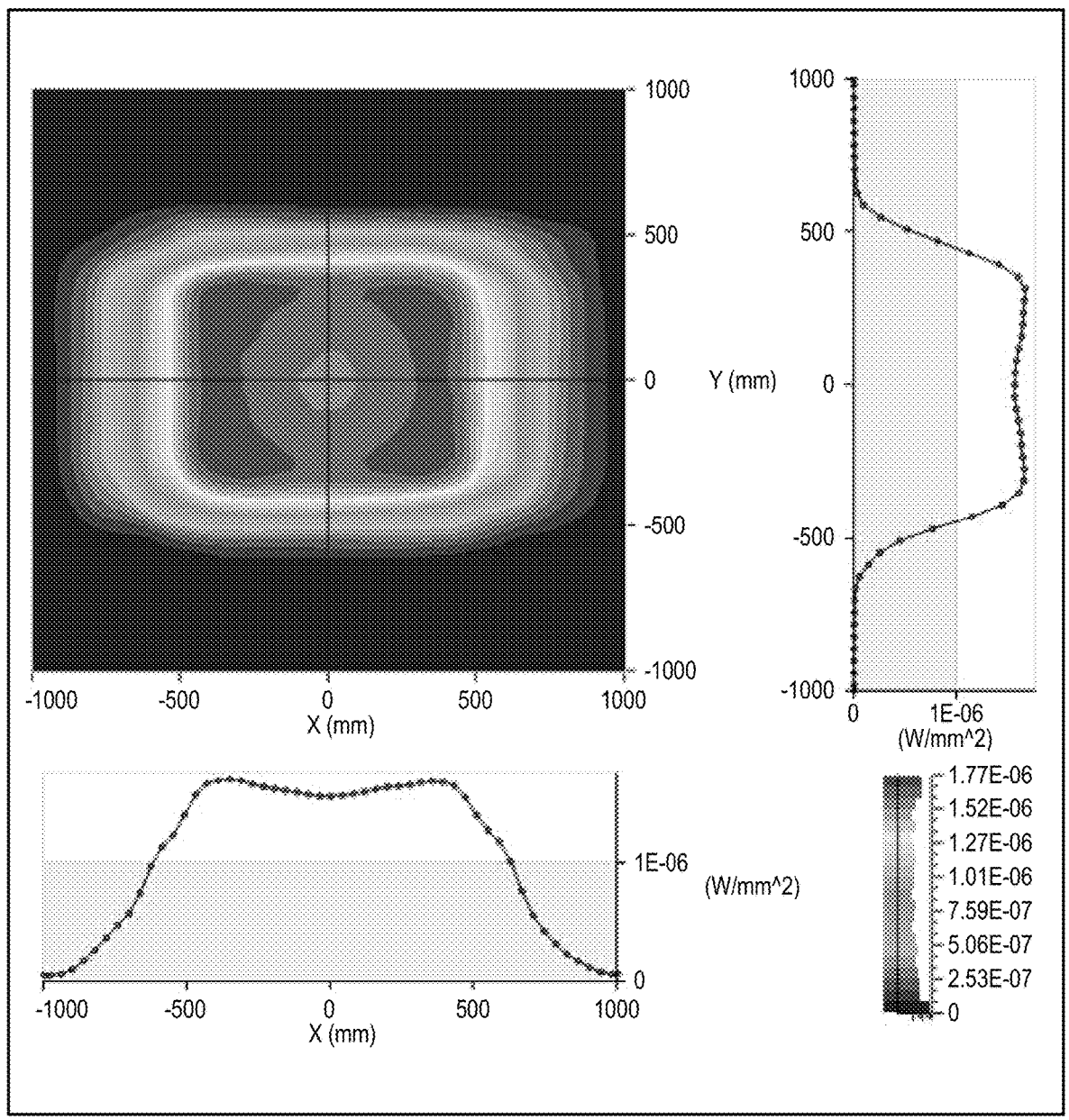
FIG. 10 is a diagram illustrating a simulation result of the light orientation according to Example 2.

It was found from the results illustrated in FIG. 8 to FIG. 10 that imaging device 1 including diffuser plate 3 according to Example 2 designed based on the above conditions could obtain an image in which unevenness due to the interference fringes is noticeable. That is, it was confirmed that when diffuser plate 3 in which period T of the interference fringes on imaging element 5 was larger than three pixels of imaging element 5 was used, unevenness due to the interference fringes was noticeable on the obtained image.

Example 3

An effect of imaging device 1 according to Example 3 obtained by designing diffuser plate 3 described in the above exemplary embodiment under the following conditions will be described.

First, period T of the interference fringes on imaging element 5 was set to be within a range of 0<T≤3, and the positions of vertexes 310 of lenses 30 were matched with the positions of corresponding grid points 40. In such a manner, diffuser plate 3 was manufactured.

More specifically, pix was 0.0112 mm, EFL was 2.09 mm, L was 1000 mm, λ was 855 nm, and m was one period. Further, T1 was about 5.36 mm, d1 was 0.36 mm, T2 in the first direction was about 2.4 mm, T in the first direction was about 0.8 pixel, d2 was 0.23 mm, T2 in the second direction was about 3.7 mm, and T in the second direction was about 2.3 pixels. Note that the above conditions are the same as the conditions of the diffuser plate according to Example 1 except that the positions of vertexes 310 of lenses 30 are matched with the positions of corresponding grid points 40.

Diffuser plate 3 according to Example 3 designed under the above conditions was manufactured, and was installed in imaging device 1 to be evaluated. Obtained results are shown in FIG. 11 and FIG. 12.

Figure 11:
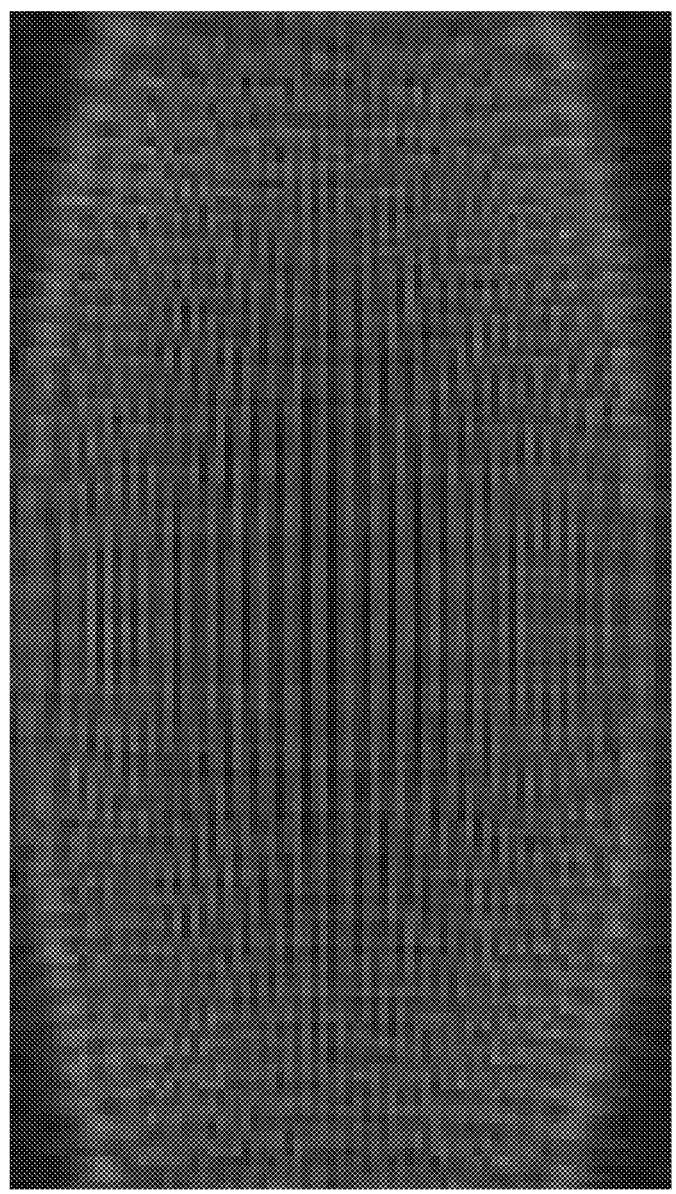
FIG. 11 is a diagram illustrating a simulation result of the interference fringes on the light receiving surface of the imaging element in the imaging device according to Example 3.

FIG. 11 is a diagram illustrating a simulation result of the interference fringes on the light receiving surface of the imaging element in the imaging device according to Example 3. FIG. 12 is a diagram illustrating a simulation result of the light orientation according to Example 3.

Figure 12:
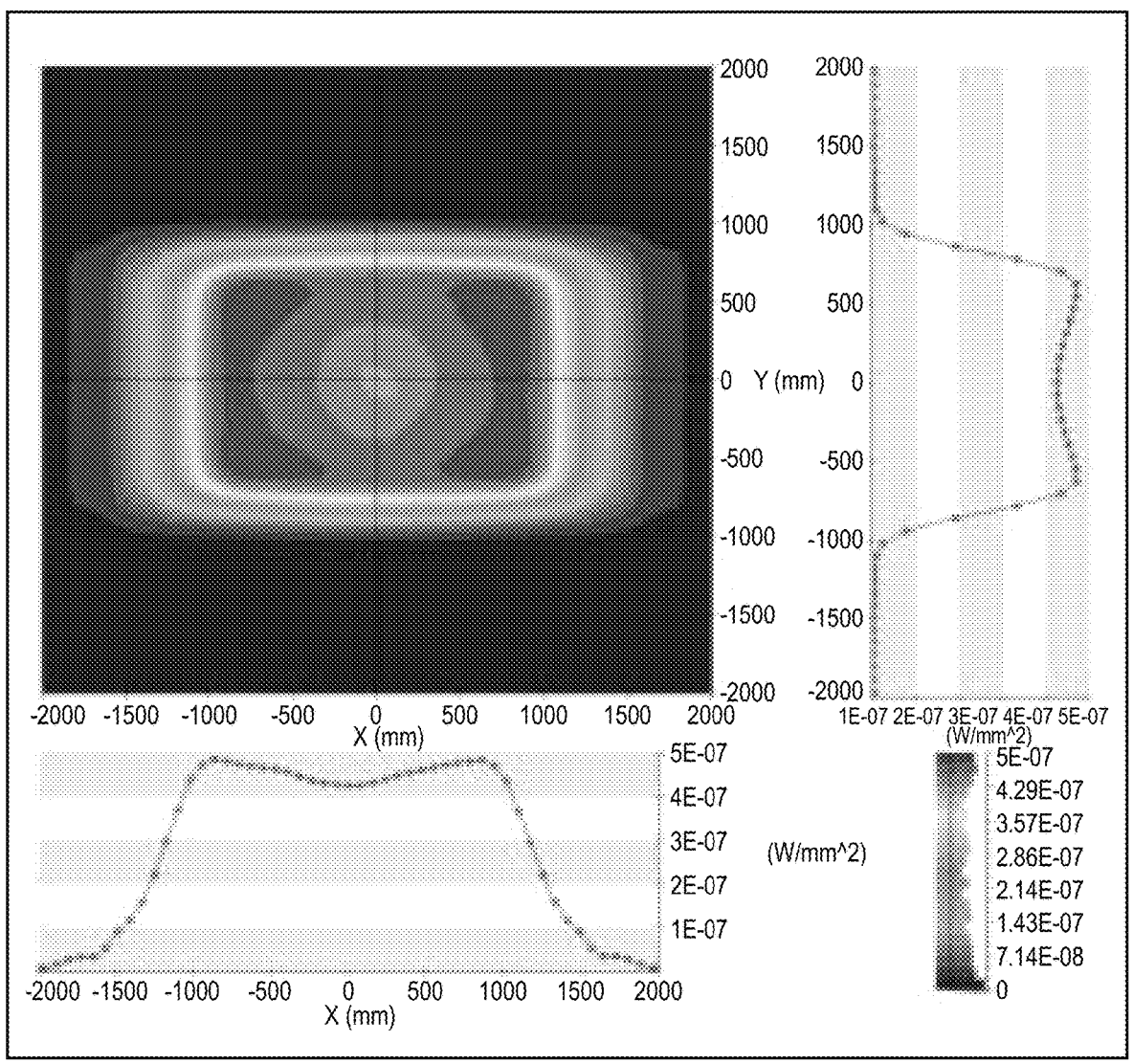
FIG. 12 is a diagram illustrating a simulation result of the light orientation according to Example 3.

It was found from the results illustrated in FIG. 11 and FIG. 12 that imaging device 1 including diffuser plate 3 according to Example 3 designed based on the above conditions caused interference fringes. However, it was found that the caused interference fringes had fine period such that the interference fringes could be suppressed to an unnoticeable level in a manner that, for example, processor 6 executed the filter process.

That is, since the plurality of lenses 30 were regularly arranged in a matrix pattern, interference fringes were caused in diffuser plate 3 according to Example 3. However, it was confirmed that the period of the interference fringes could be finely placed, namely, the interference fringes could be suppressed to an unnoticeable level by the filter process in processor 6 using the diffuser plate designed so that period T of the interference fringes on imaging element 5 was set to the range of 0<T≤3.

Example 4

An effect of imaging device 1 according to Example 4 obtained by designing diffuser plate 3 described in the above exemplary embodiment under the following conditions will be described.

First, period T of the interference fringes on imaging element 5 was set to be within a range of 3<T, and the positions of vertexes 310 of lenses 30 were matched with the positions of corresponding grid points 40. In such a manner, diffuser plate 3 was manufactured.

More specifically, pix was 0.0112 mm, EFL was 3.68 mm, L was 1000 mm, λ was 855 nm, and m was one period. Further, T1 was 3.04 mm, d1 was 0.28 mm, T2 in the first direction was about 3.1 mm, T in the first direction was about 8 pixels, d2 was 0.2 mm, T2 in the second direction was about 4.3 mm, and T in the second direction was about 3.5 pixels. Note that the above conditions are equal to the conditions of the diffuser plate according to Example 2 except that the positions of vertexes 310 of lenses 30 are matched with the positions of corresponding grid points 40.

Diffuser plate 3 according to Example 3 designed under the above conditions was manufactured, and was installed in imaging device 1 to be evaluated. Obtained results are shown in FIG. 13 and FIG. 14.

Figure 13:
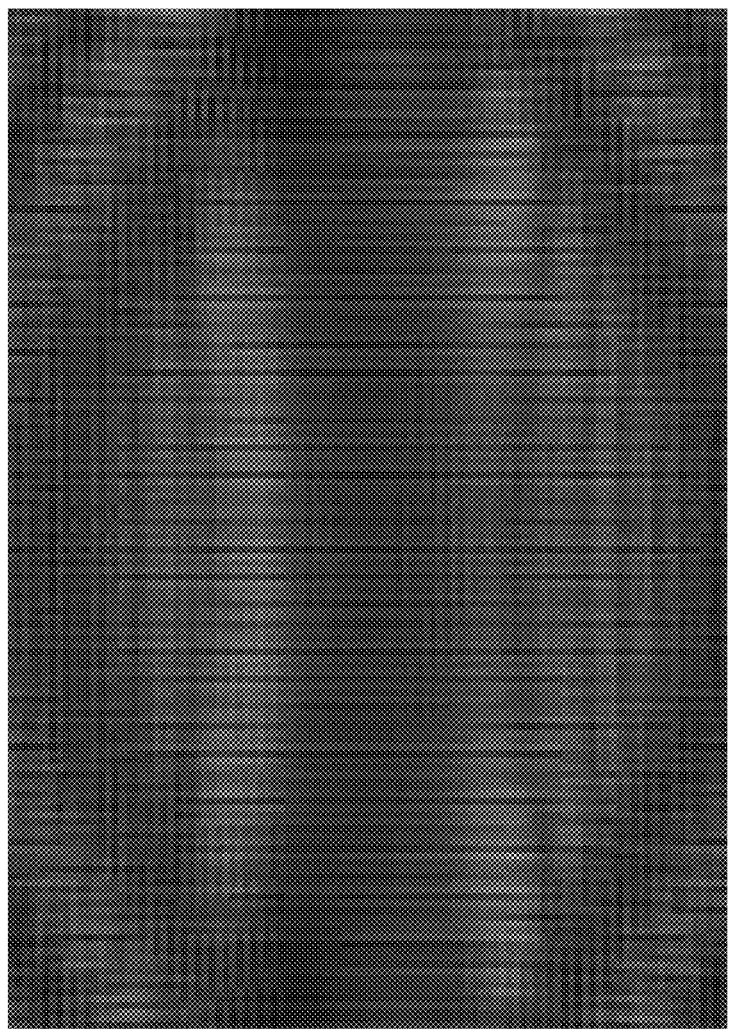
FIG. 13 is a diagram illustrating a simulation result of the interference fringes on the light receiving surface of the imaging element in the imaging device according to Example 4.

FIG. 13 is a diagram illustrating a simulation result of the interference fringes on the light receiving surface of the imaging element in the imaging device according to Example 4. FIG. 14 is a diagram illustrating a simulation result of the light orientation according to Example 4.

Figure 14:
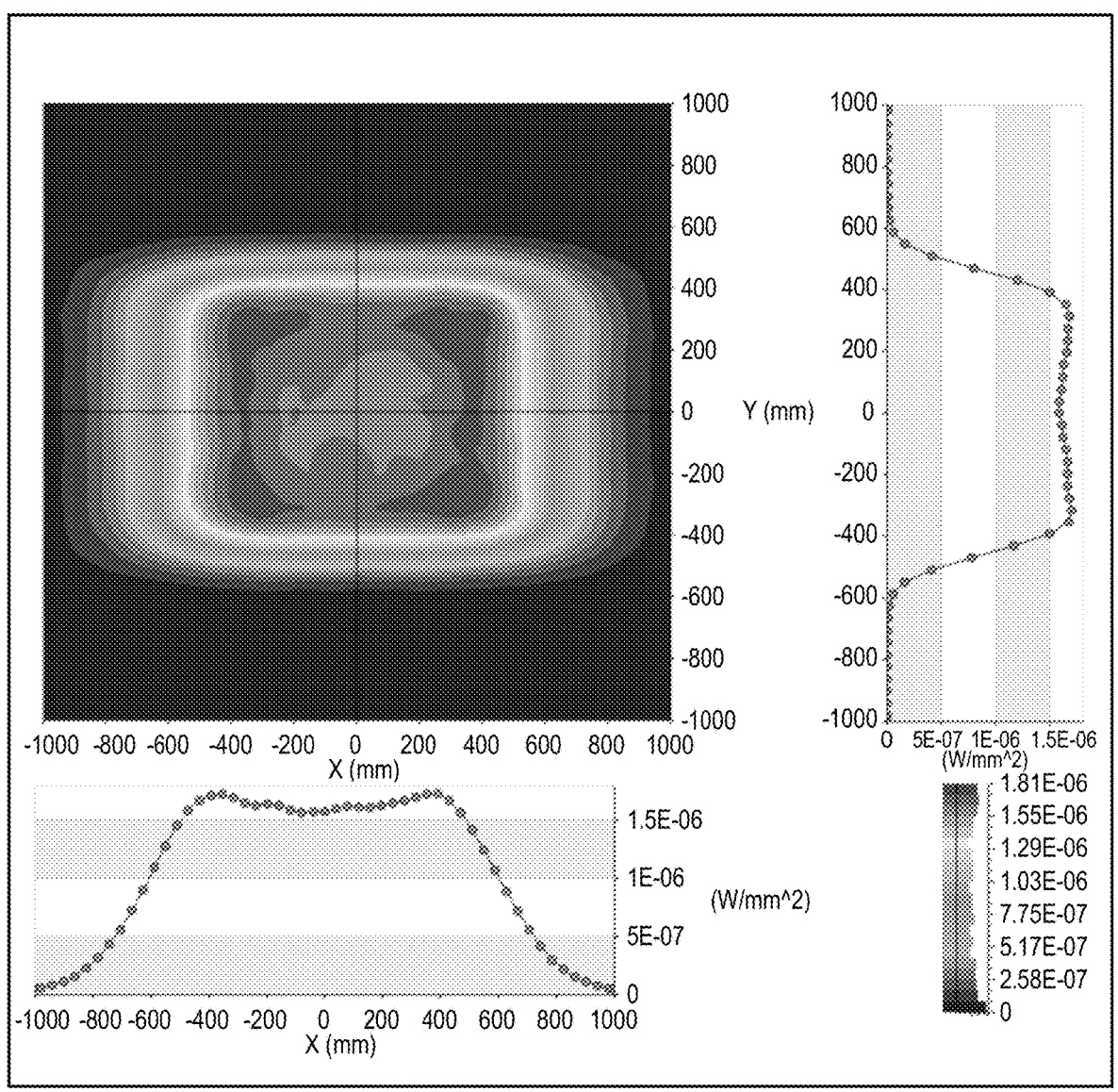
FIG. 14 is a diagram illustrating a simulation result of the light orientation according to Example 4.

It was found from the results illustrated in FIG. 13 and FIG. 14 that imaging device including diffuser plate 3 according to Example 4 designed based on the above conditions caused noticeable interference fringes. That is, it was confirmed that when diffuser plate 3 in which period T of the interference fringes on imaging element 5 was larger than three pixels constituting the pixel group of imaging element 5 and the plurality of lenses 30 were regularly arranged in a matrix pattern, noticeable interference fringes were caused.

Example 5

An effect of imaging device 1 according to Example 5 obtained by designing diffuser plate 3 described in the above exemplary embodiment under the following conditions will be described.

First, period T of the interference fringes on imaging element 5 was within a range of 0<T≤3, and the positions of vertexes 310 of lenses 30 were randomly shifted from corresponding grid points 40. At this time, diffuser plate 3 was manufactured under a condition that the shift amount was 20% of interval d between adjacent grid points 40.

More specifically, pix was 0.0112 mm, EFL was 2.09 mm, L was 1000 mm, λ was 855 nm, and m was one period. Further, T1 was about 5.36 mm, d1 was 0.36 mm, T2 in the first direction was about 2.4 mm, T in the first direction was about 0.8 pixel, d2 was 0.23 mm, T2 in the second direction was about 3.7 mm, and T in the second direction was about 2.3 pixels. The above conditions are equal to the conditions of the diffuser plate according to Example 1 except that the shift amount of vertexes 310 of lenses 30 was 20% of interval d between adjacent grid points 40.

Diffuser plate 3 according to Example 5 designed under the above conditions was manufactured, and was installed in imaging device 1 to be evaluated. Obtained results are shown in FIG. 15 and FIG. 16.

Figure 15:
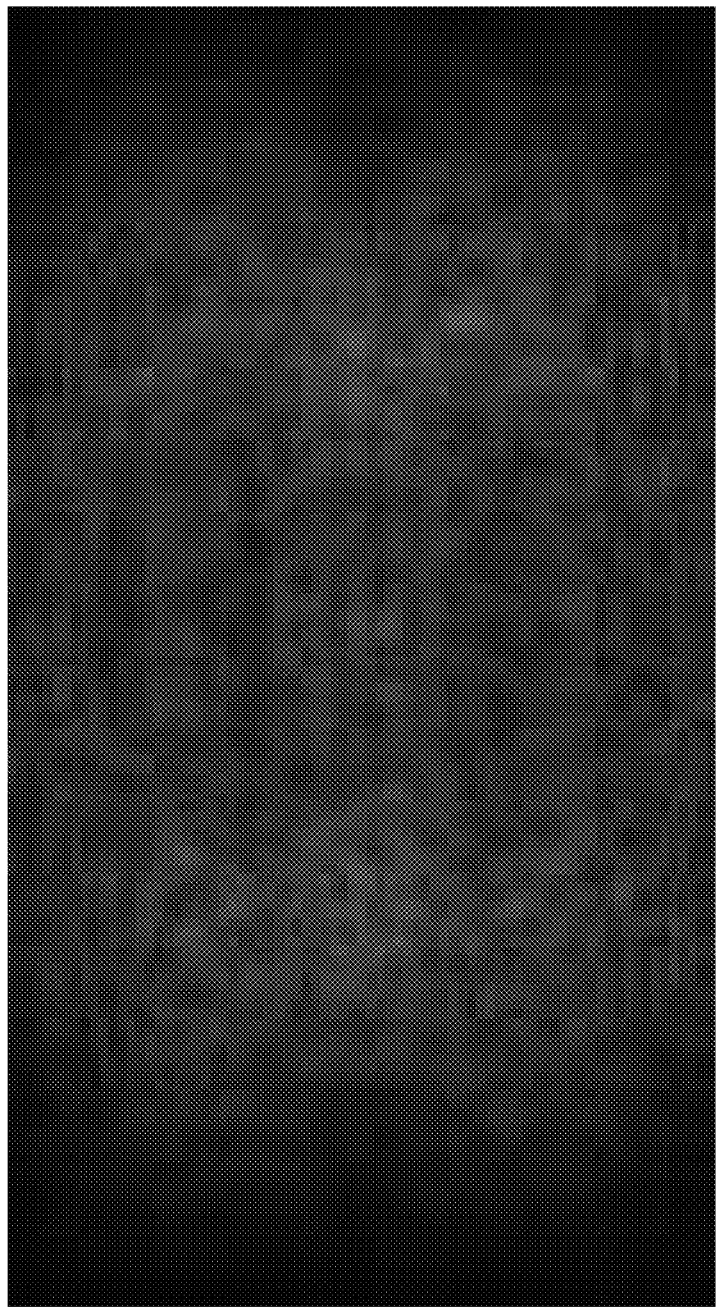
FIG. 15 is a diagram illustrating a simulation result of the interference fringes on the light receiving surface of the imaging element in the imaging device according to Example 5.

FIG. 15 is a diagram illustrating a simulation result of the interference fringes on the light receiving surface of the imaging element in the imaging device according to Example 5. FIG. 16 is a diagram illustrating a simulation result of the light orientation according to Example 5.

Figure 16:
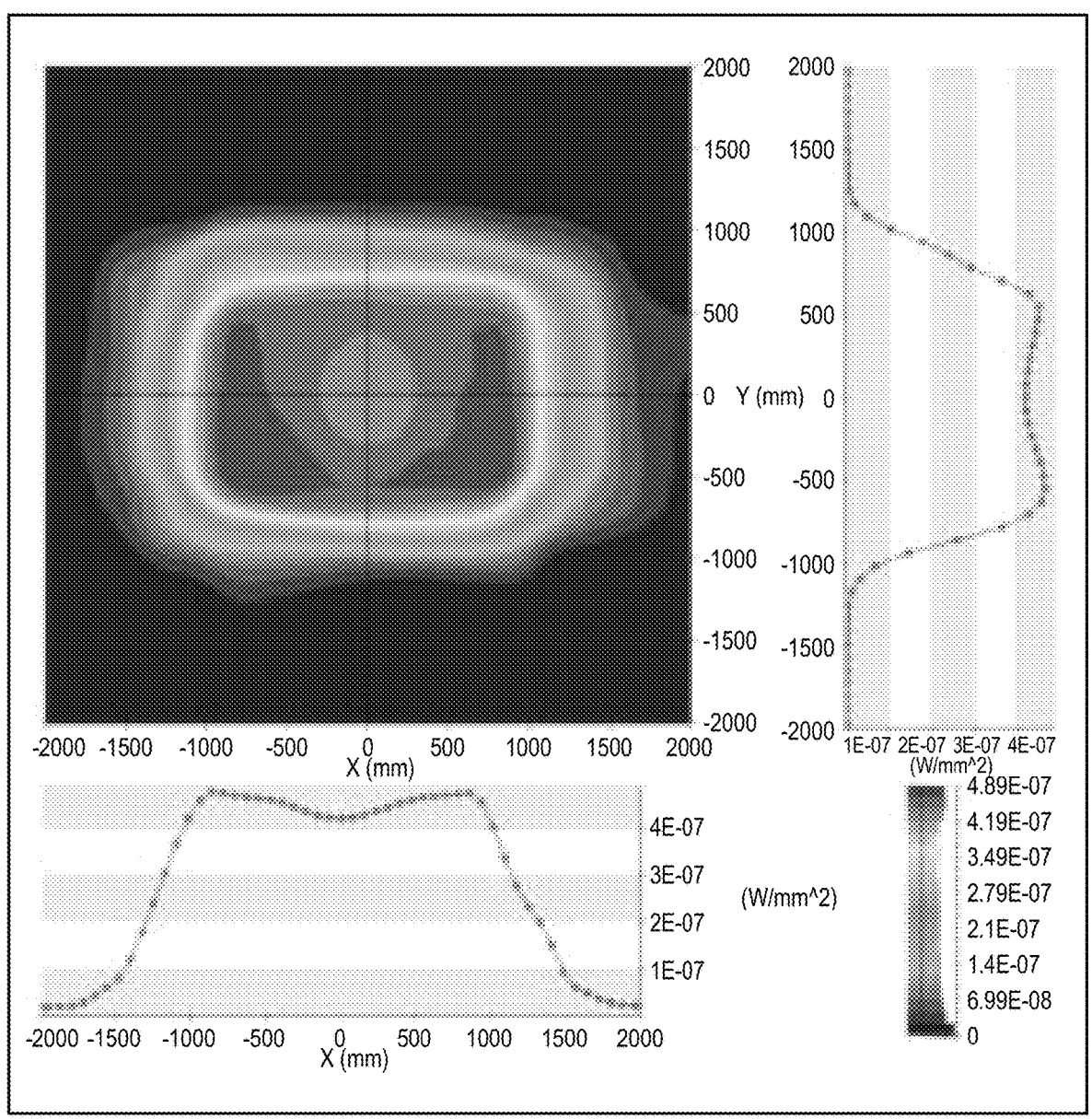
FIG. 16 is a diagram illustrating a simulation result of the light orientation according to Example 5.

It was found from the results illustrated in FIG. 15 and FIG. 16 that the imaging device including diffuser plate 3 according to Example 5 designed based on the above conditions provided rectangular light orientation. That is, it was confirmed that even if the shift amount of the positions of vertexes 310 of lenses 30 from grid points 40 was 20% of interval d between adjacent grid points 40, the rectangular light orientation was provided.

Example 6

An effect of imaging device 1 according to Example 6 obtained by designing diffuser plate 3 described in the above exemplary embodiment under the following conditions will be described.

First, period T of the interference fringes on imaging element 5 was within a range of 0<T≤3, and the positions of vertexes 310 of lenses 30 were randomly shifted from corresponding grid points 40. At this time, diffuser plate 3 was manufactured under a condition that the shift amount was 30% of interval d between adjacent grid points 40.

More specifically, pix was 0.0112 mm, EFL was 2.09 mm, L was 1000 mm, λ was 855 nm, and m was one period. Further, T1 was about 5.36 mm, d1 was 0.36 mm, T2 in the first direction was about 2.4 mm, T in the first direction was about 0.8 pixel, d2 was 0.23 mm, T2 in the second direction was about 3.7 mm, and T in the second direction was about 2.3 pixels. Note that the above conditions were the same as the conditions of the diffuser plate according to Examples 1 and 4 except that the shift amount of vertexes 310 of lenses 30 was 30% of interval d between adjacent grid points 40.

Diffuser plate 3 according to Example 6 designed under the above conditions was manufactured, and was installed in imaging device 1 to be evaluated. Obtained results are shown in FIG. 17 and FIG. 18.

Figure 17:
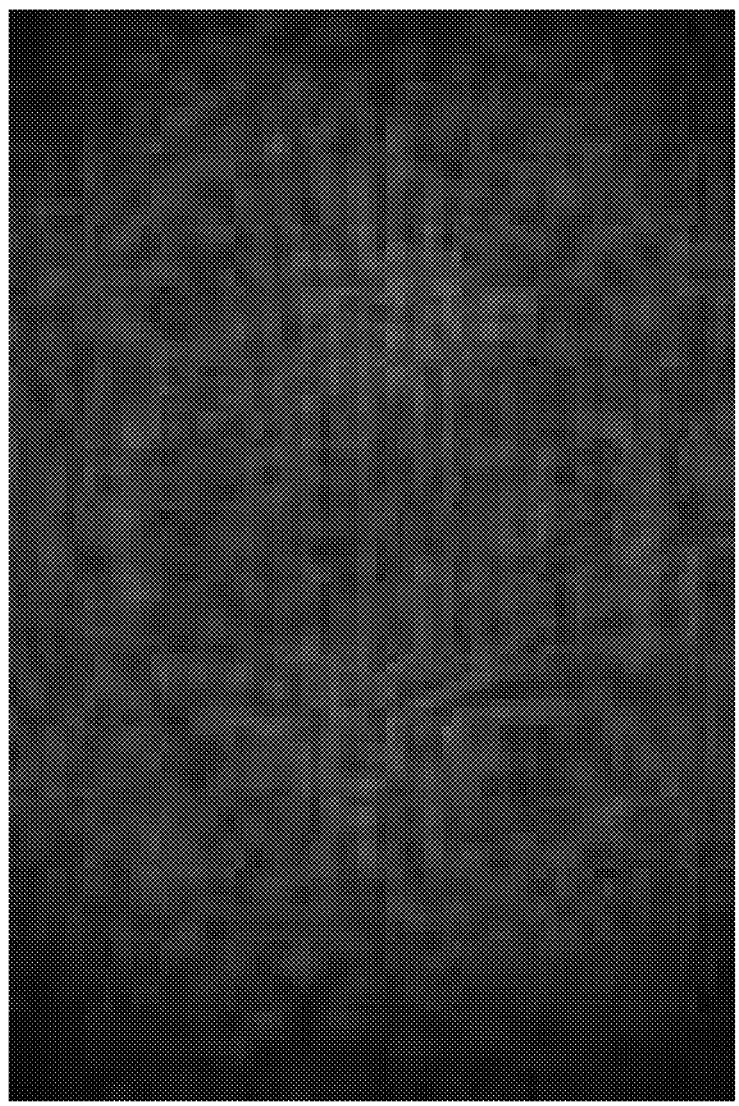
FIG. 17 is a diagram illustrating a simulation result of the interference fringes on the light receiving surface of the imaging element in the imaging device according to Example 6.

FIG. 17 is a diagram illustrating a simulation result of the interference fringes on the light receiving surface of the imaging element in the imaging device according to Example 6. FIG. 18 is a diagram illustrating a simulation result of the light orientation according to Example 6.

Figure 18:
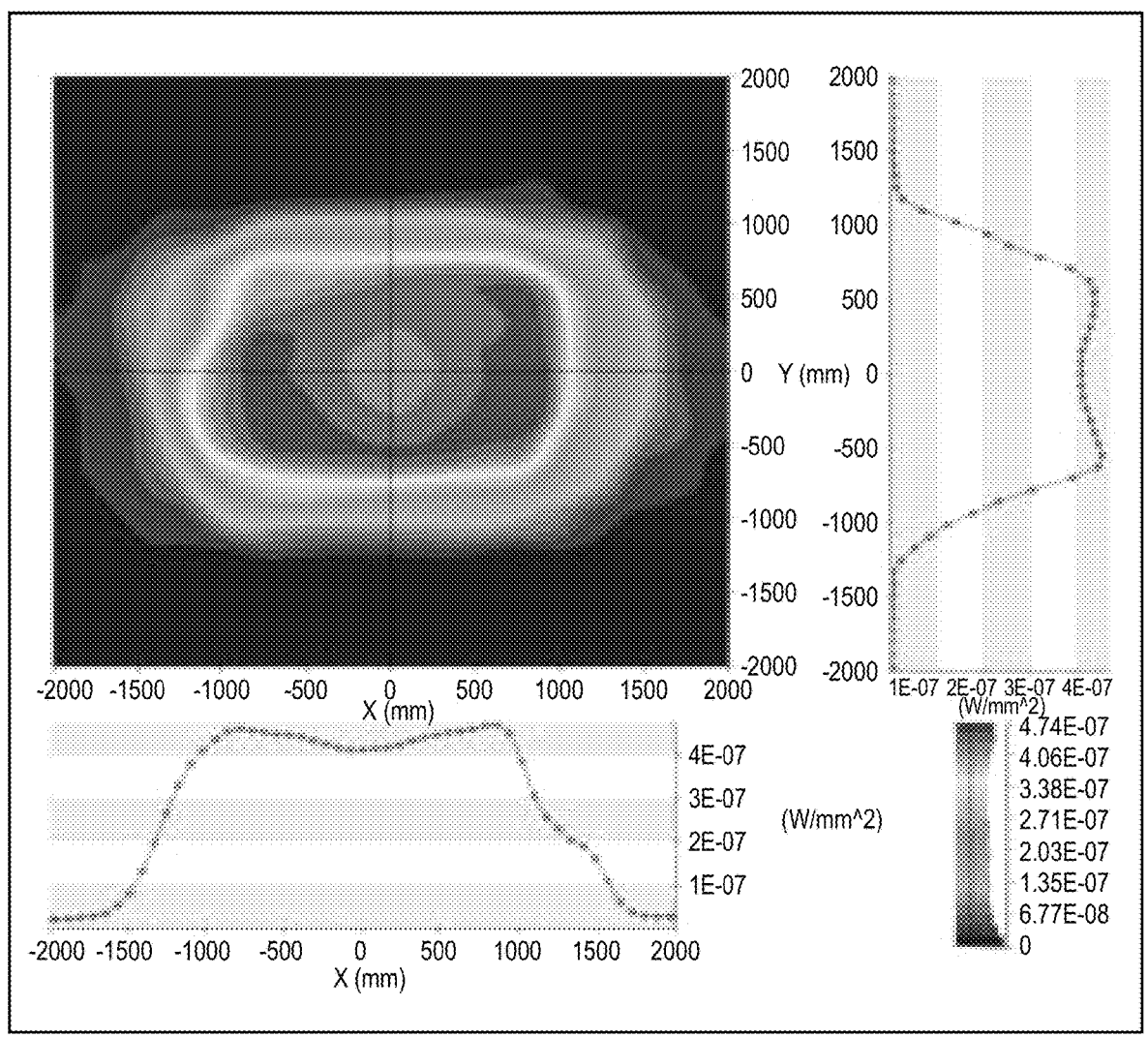
FIG. 18 is a diagram illustrating a simulation result of the light orientation according to Example 6.

It was found from the results illustrated in FIG. 17 and FIG. 18 that the imaging device including diffuser plate 3 according to Example 6 designed based on the above conditions did not provide rectangular light orientation. That is, it was confirmed that when the shift amount of the positions of vertexes 310 of lenses 30 from grid points 40 was 30% of adjacent grid points 40, the rectangular light orientation was deformed to an unpractical level, and thus sufficient rectangular light orientation was not provided.

That is, according to Examples 1 to 6 described above, it was found that when period T of the interference fringes on imaging element 5 was set to be within a range of 0<T≤3 and the positions of vertexes 310 was shifted so that the shift amount of the positions of vertexes 310 of lenses 30 from grid points 40 was less than or equal to 20%, an influence of the interference fringes of the diffused light was sufficiently suppressed and thus sufficient rectangular light orientation was provided.

The imaging device of the present invention is not limited to the above-described exemplary embodiment, and it is obvious that various changes may be made without departing from the gist of the present invention.

For example, another configuration can be added to the configuration according to the exemplary embodiment. Further, a part of the configuration according to the exemplary embodiment can be replaced by another configuration.

The above exemplary embodiment has described diffuser plate 3 having the configuration that the positions of vertexes 310 of lenses 30 are randomly shifted from corresponding grid points 40, but the present invention is not limited to this. For example, diffuser plate 3 may be configured so that the positions of vertexes 310 of lenses 30 are matched with corresponding to grid points 40. That is, the plurality of lenses 30 may be regularly arranged in a matrix direction (matrix pattern) on a predetermined plane according to the basic arrangement. Even in this configuration, when the period of the interference fringes in the reflection light that is received by imaging element 5 from subject t is less than or equal to the size of the pixel group in the filter process, an influence of the interference fringes on the image to be obtained by imaging element 5 can be effectively suppressed. In this case, similarly to the above-described exemplary embodiment, it is preferable that the unit of the pixel group in the filter process is pixels arranged in a matrix pattern of 3×3 and is less than or equal to three pixels of the imaging element.

Further, the above-described exemplary embodiment has described the configuration of imaging device 1 in which the image obtained by imaging element 5 is subjected to the filter process using the median filter, the moving-average filter, and the Gaussian filter, but the present invention is not limited to this. For example, imaging device 1 may be configured so that the image obtained by imaging element 5 is not subjected to the filter process such as the smoothing process. Also in this configuration, the period of the interference fringes in the diffused light may be less than or equal to three pixels of imaging element 5. As a result, an influence of the interference fringes on the image obtained by imaging element 5 can be suppressed.

INDUSTRIAL APPLICABILITY

The present invention can suppress an influence of interference fringes of diffused light on an image obtained when light diffused by a diffuser plate having a plurality of lenses is emitted to a subject and imaging is performed. For this reason, the present invention is applicable to an imaging device such as a distance image camera employing a Time of Flight (TOF) method for generating a three-dimensional distance distribution image.

REFERENCE MARKS IN THE DRAWINGS

1: imaging device
2: light source
3: diffuser plate
4: image forming lens
5: imaging element
6: processor 30: lens
31: lens array
40: grid point
41: first grid line
42: second grid line
51: light receiving surface
310: vertex
d1: long diameter direction
d2: short diameter direction
d, d1, d2: interval
EFL: focal distance
L: distance
pix: one pixel pitch
T, T2: period
T1: length
t: subject

The invention claimed is:

1. An imaging device comprising:
a light source;
a diffuser plate that includes a plurality of lenses disposed adjacent to one another on a predetermined plane and that diffuses light emitted from the light source; and
an imaging element that includes a plurality of pixels, the imaging element being configured to receive reflection light generated by causing the light diffused by the diffuser plate to be reflected from a subject,
wherein the plurality of lenses are disposed so that a period of interference fringes in the light having been diffused is less than or equal to three pixels of the imaging element.

2. An imaging device comprising:
a light source;
a diffuser plate that includes a plurality of lenses disposed adjacent to one another on a predetermined plane and that diffuses light emitted from the light source;
an imaging element that has a light receiving surface for receiving reflection light generated by causing the light diffused by the diffuser plate to be reflected from a subject and that outputs a signal corresponding to the reflection light received by the light receiving surface; and
a processor that executes a filter process on the signal output from the imaging element in a unit of a pixel group constituted by a plurality of adjacent pixels in the imaging element,
wherein the plurality of lenses are disposed so that a period of interference fringes in the light having been diffused is less than or equal to a size of the pixel group of the imaging element.

3. The imaging device according to claim 1, wherein
the plurality of lenses are disposed in a state where positions of vertexes of the lenses are randomly shifted on the predetermined plane respectively from a plurality of virtual grid points arranged in a first direction and a second direction perpendicular to the first direction with intervals along the predetermined plane,
a shift amount between each of the positions of the vertexes of the lenses and a corresponding one of the plurality of virtual grid points in the first direction or the second direction is less than or equal to 20% of an interval between virtual grid points adjacent to each other in the first direction or the second direction from among the plurality of virtual grid points.

4. The imaging device according to claim 2, wherein
the plurality of lenses are disposed in a state where positions of vertexes of the lenses are randomly shifted on the predetermined plane respectively from a plurality of virtual grid points arranged in a first direction and a second direction perpendicular to the first direction with intervals along the predetermined plane,
a shift amount between each of the positions of the vertexes of the lenses and a corresponding one of the plurality of virtual grid points in the first direction or the second direction is less than or equal to 20% of an interval between virtual grid points adjacent to each other in the first direction or the second direction from among the plurality of virtual grid points.

* * * * *